United States Patent [19]

Khorsand

[11] 4,378,560
[45] Mar. 29, 1983

[54] REFLECTOR SUPPORT STRUCTURE

[76] Inventor: Hossein M. Khorsand, 33042 Commodore Ct., San Juan Capistrano, Calif. 92675

[21] Appl. No.: 152,516

[22] Filed: May 22, 1980

[51] Int. Cl.³ .......................................... H01Q 15/14
[52] U.S. Cl. ..................................... 343/912; 52/80
[58] Field of Search ............... 343/914, 912, 915, 840; 52/80, 83, 27, 648

[56] References Cited

U.S. PATENT DOCUMENTS

| | | | |
|---|---|---|---|
| 2,985,881 | 5/1961 | Holland | 343/912 |
| 3,139,957 | 7/1964 | Fuller | 52/80 |
| 3,508,270 | 4/1970 | Cook | 343/840 |
| 3,618,111 | 11/1971 | Vaughan | 343/840 |
| 4,130,969 | 12/1978 | Ivanov | 52/80 |

FOREIGN PATENT DOCUMENTS

| | | | |
|---|---|---|---|
| 394514 | 8/1973 | U.S.S.R. | 52/83 |
| 402970 | 3/1974 | U.S.S.R. | 343/912 |
| 691539 | 10/1979 | U.S.S.R. | 52/80 |

OTHER PUBLICATIONS

*Architectural Record*, Aug. 1959, pp. 178-181.

Primary Examiner—Price C. Faw, Jr.
Assistant Examiner—Henry E. Raduuzo
Attorney, Agent, or Firm—Paul F. Horton

[57] ABSTRACT

A lightweight support structure for electromagnetic and light reflectors including at least two rigid compression rings of any diametrical ratio held vertically spaced and parallel by a plurality of rigid vertically extending peripheral columns and two or more flexible cable sets vertically spaced and parallel with the compression rings. Nodes or junctures on the cable sets are adapted to remain fixed in space with respect to the compression rings by a series of tangential and radial cables and thus support rigid vertical internal columns which in turn support the reflector. The internal rigid columns may progressively increase in height from a central hub to the outermost periphery of the compression rings for supporting a reflector dish of parabolic configuration.

7 Claims, 10 Drawing Figures

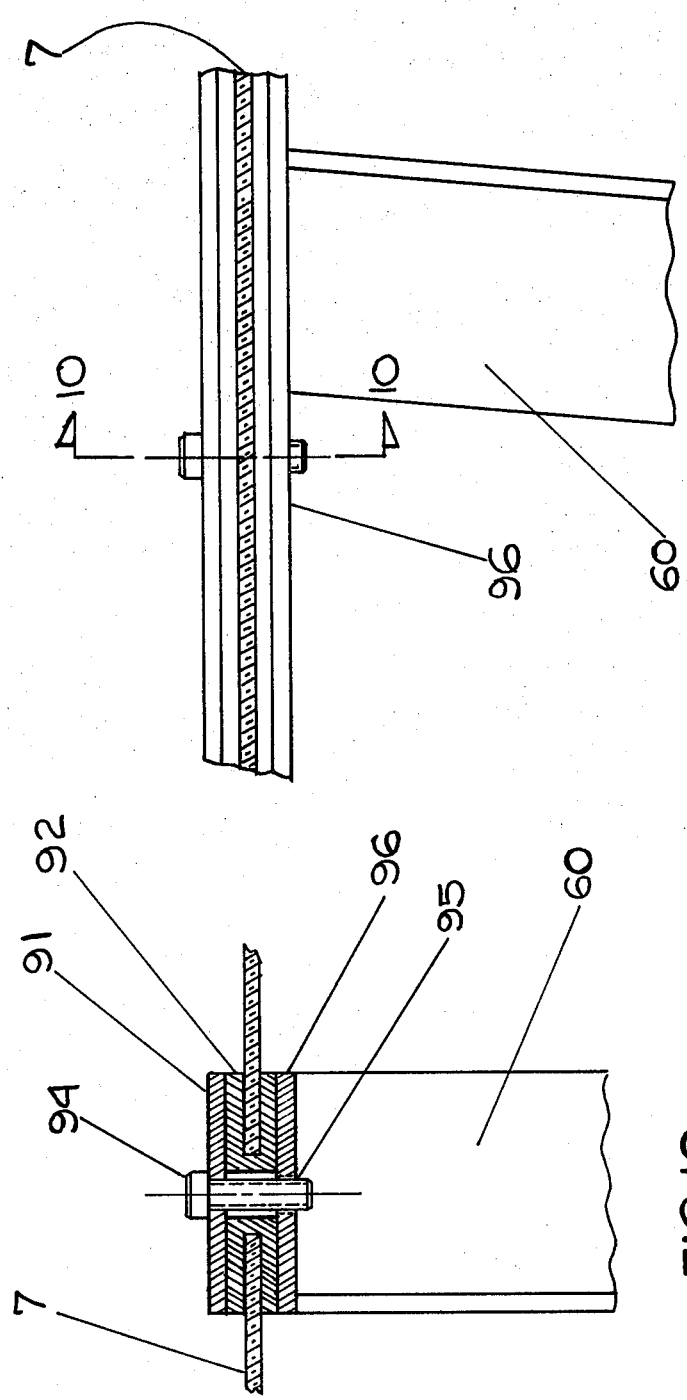

REFLECTOR SUPPORT STRUCTURE

FIELD OF THE INVENTION

This invention relates, in general, to support structures using flexible cables, and in particular, to support structures for electromagnetic and light reflection.

DESCRIPTION OF THE PRIOR ART

For working temperatures above 200° C. parabolic mirrors represent the most attractive collectors for small power plants or industrial thermal energy applications. Small collectors have the disadvantage of using many individual control, tracking, piping and receiving systems. Large collectors, on the other hand, currently require heavy and expensive supporting structures. The same is true of microwave dish antennas. Experience with building microwave dish antennas has shown that conventional truss structures, no matter how well optimized for maximum rigidity and minimum weight, cannot provide an economicly feasible design for solar collectors. To compound the problem, a large collector having a heavy support structure requires an expensive tracking system which may cost more than the collector itself. Furthermore, a heavy dish structure drops the overall energy collection efficiency due to the extra energy consumption required for tracking. Currently, the most challenging problem relating to dish reflectors is reducing the weight and the cost of the reflective surface support structure.

SUMMARY OF THE INVENTION

The present invention comprises, generally, a support structure for electromagnetic and light reflectors including two or more parallel spaced and aligned compression rings; a plurality of rigid columns connecting the rings; a plurality of parallel spaced and vertically aligned flexible cable sets attached to the rigid members; a series of internal rigid columns supported by the flexible cable sets and operable, in turn, to support a dish antenna or collector; a plurality of radially extending cross cables securing the internal rigid columns; and means for attaching a reflective dish. A more comprehensive description of the support structure may be found in the appended claims.

It is therefore a primary object of the present invention to provide a rigid but light support frame for a reflective surface.

It is also an object of the present invention to provide a cost effective support frame for reflective surfaces.

It is also an object of the present invention to permit construction of large collectors on a cost efficient basis.

Additional objects and advantages will become apparent and a more thorough and comprehensive understanding may be had from the following description taken in conjunction with accompanying drawings forming a part of this specification.

BRIEF DESCRIPTION OF THE DRAWINGS

FIG. 9 is a side elevation of one embodiment of the means for attaching a reflective dish to the support structure of the present invention;

FIG. 10 is a sectional view taken along lines 10—10 of FIG. 9.

DETAILED DESCRIPTION OF THE INVENTION

Figure 1:
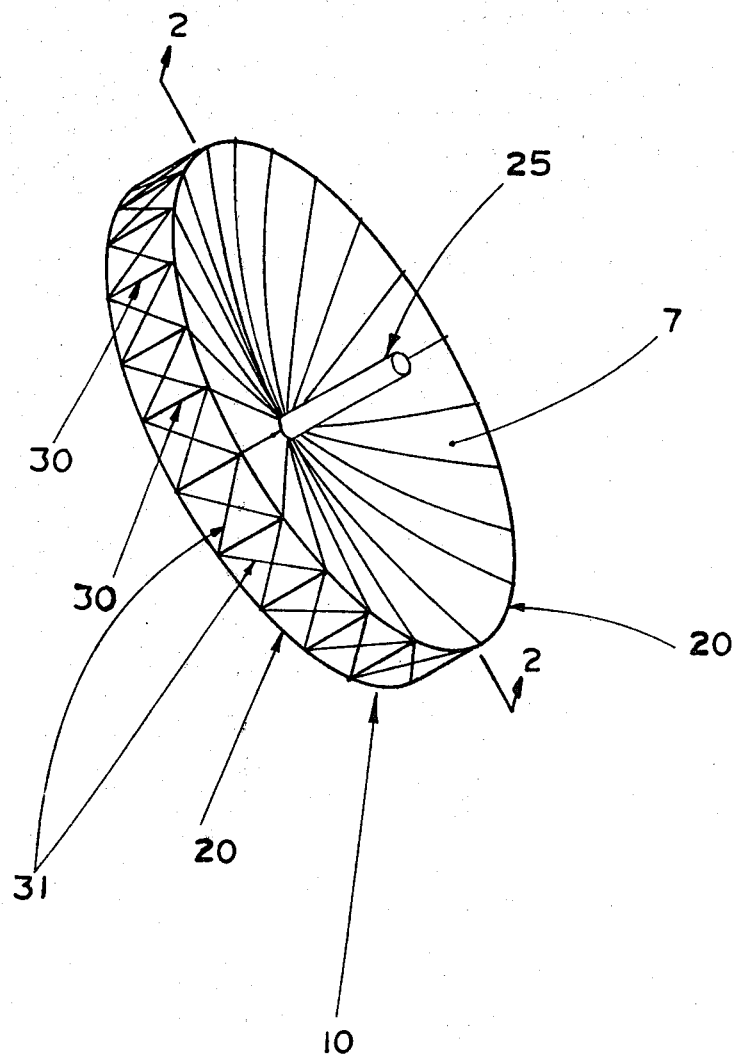
FIG. 1 is an elevated perspective view of a preferred embodiment of the present invention.
Figure 2:
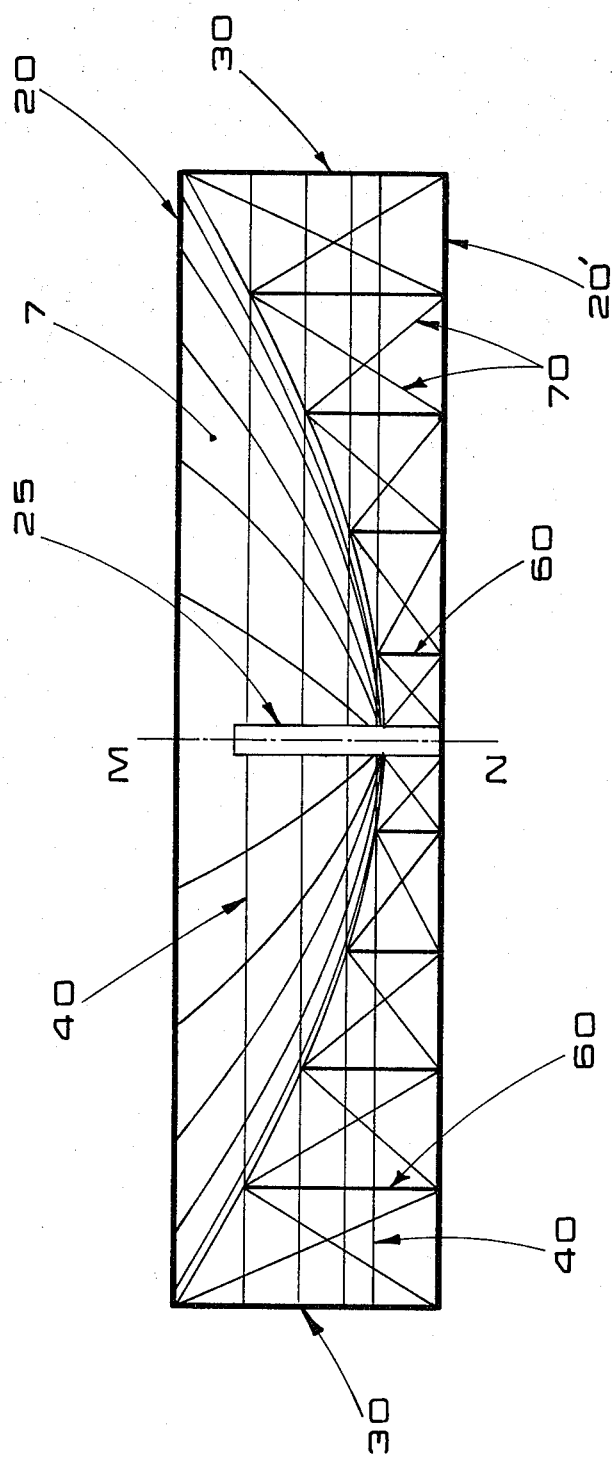
FIG. 2 is a sectional view taken through lines 2—2 of the invention of FIG. 1.
Figure 3:
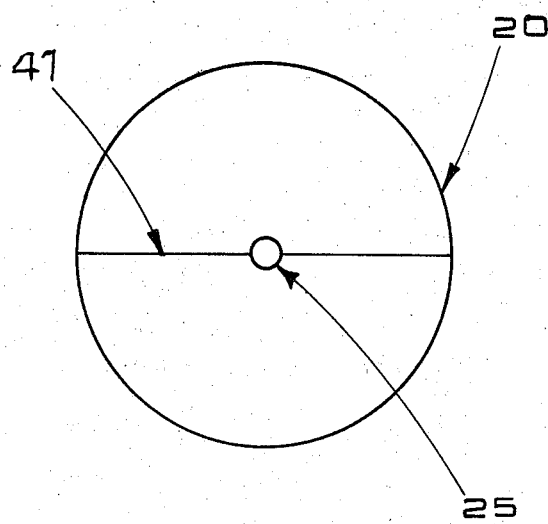
FIG. 3 shows one of the compression rings of the present invention and a single flexible radial cable attached to a hub.
Figure 4:
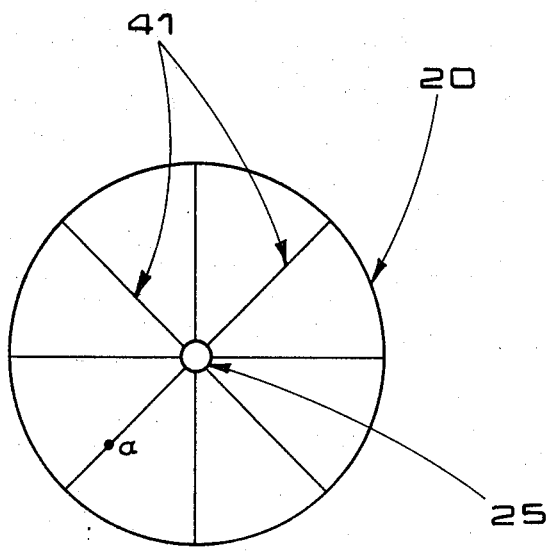
FIG. 4 shows a compression ring with a plurality of flexible radial cables.

Referring now to the drawings, and, more particularly, to FIGS. 1 and 2, an embodiment to be preferred of a support structure 10 for a dish reflector 7, made according to the present invention is disclosed. Support structure 10, in the preferred embodiment, includes at least two substantially planar and rigid enclosure members, compression rings 20; a plurality of rigid outer columns 30; at least two spaced sets of flexible cables designated generally by the numeral 40; a plurality of rigid internal columns 60; and a plurality of flexible cross cables 70. The cables of the present invention may be made of any suitable flexible material. Flexible steel cables having a plurality of strands are preferred.

Compression rings 20 are annular in construction although it is obvious that rings having a multiplicity of equilateral sides may also readily be used. Each ring lies in a single plane and may be constructed of any suitable material. Rings 20 may be equipped with a plurality of equidistant and radially extending threaded apertures and a plurality of threaded members screwable into the threaded apertures, the use of which will hereinafter be explained.

As shown in FIGS. 1 and 2, rings 20 are parallel spaced from one another about a common axis perpendicular to the planes of the rings. The compression rings are held in fixed alignment by a plurality of rigid outer columns 30 equidistantly spaced about the periphery of the rings. Rigid outer columns 30 are securely connected to the compression rings and bear the weight of the rings relative to one another. Columns 30 may be constructed of any suitable structural sections. The central axis M, N is preferably held perpendicular to the planes of the compression rings by a series of diagonal support members 31, shown to advantage in FIG. 1. Support members 31 may be rigid retilinear rods or, more preferably flexible and tautly strung cables.

Referring now to FIGS. 3 through 6 and to FIG. 2, in particular, the flexible cable sets, designated generally by the numeral 40 may be seen to advantage. Each cable set includes a plurality of radial cables 41; a plurality of internal cables 42 forming one or more concentric polygons; and at least one restraining member 43 for each polygon of internal cables. As may be seen in FIGS. 3 and 4, radial cables 41 are connected to and between selected opposing attachment sites on compression ring 20. Similarly, the radial cables may be attached to and between selected opposing attachment sites on rigid outer columns 30. All cables of a given set are in a single plane parallel with the compression rings. For this reason, the radial cables are each affixed adjacent the common perpendicular axis of the rings to a common cylindrical hub 25. Each radial cable 41 is stretched under a selected tension by turn-buckles, not shown, threaded screw members, or other stretching means.

The compression rings and the outer columns to which the radial cables are attached resist the tension forces applied by the flexible radial cables held together at the hub. As may be observed in FIG. 4, any point on radial cables 41, such as point "a", is fixed with respect to the ring or columns in the radial direction.

Figure 5:
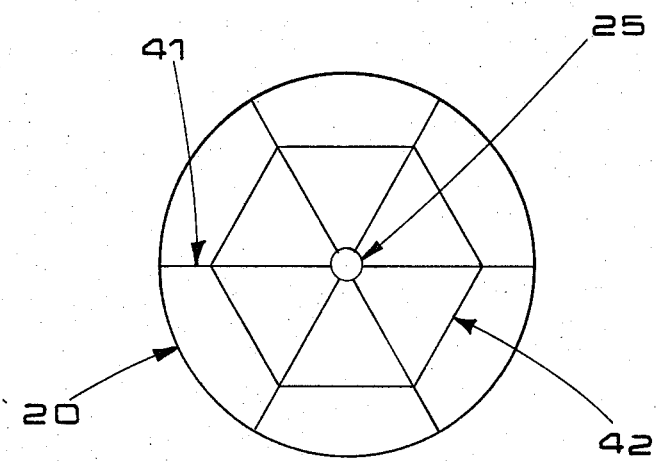
FIG. 5 shows a plurality of flexible internal cables connected to the radial cables of FIG. 4.

Flexible internal cables 42 are tautly stretched to and between selected attachment sites on cross cables 41 at points substantially equidistant from the hub and therefore from the common axial center of the rings to form a polygonal enclosure, as may be seen in FIG. 5. It is obvious that a single cable may also be used in stretching from adjacent cross cables to define the polygon, however, in doing so, a plurality of internal cable segments are thereby formed. It is then, in this sense that "plurality" is used in these specifications and in the appended claims. With the internal cables connected to the radial cables, it will be noted that if any juncture or node between internal cable 42 and radial cable 41 is moved in a tangential direction, as for example point "a", that all other junctures, represented by points "b" through "f" must follow the motion of point "a". While it is contemplated that because of added weight only one series of internal cables be used per cable set, i.e. only one internal polygonal enclosure formed per cable set, under certain circumstances more internal cables may be used.

Figure 6:
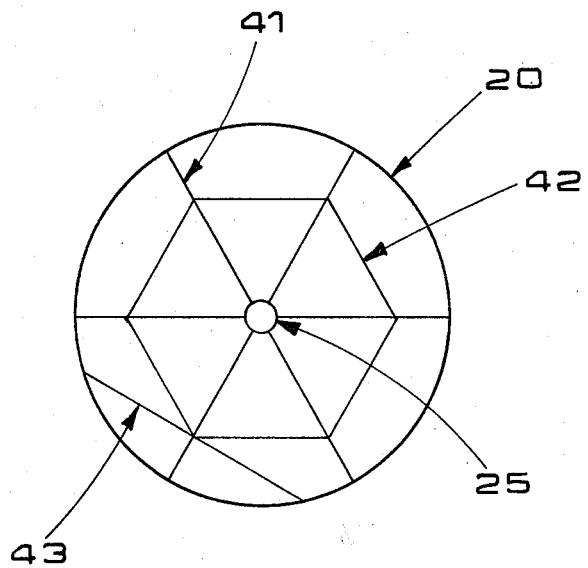
FIG. 6 shows the cable system of FIG. 5 with the addition of a restraining member.

Now, referring to FIG. 6, the attachment of restraining member 43 may be seen. Restraining member 43 preferably includes but a single flexible cable tautly connected between adjacent attachment sites "g" and "h" on either the compression rings, as shown in FIG. 6, or on rigid columns 30. The restraining member attaches at or adjacent to one of the junctures of the internal cables 42 with one of the radial cables 41, as at point "a" in FIG. 6. It may now be observed that juncture "a" as well as all other respective junctures denoted by the letters "b" through "f" are fixed in a plane now referred to as the x, y plane.

Figure 7:
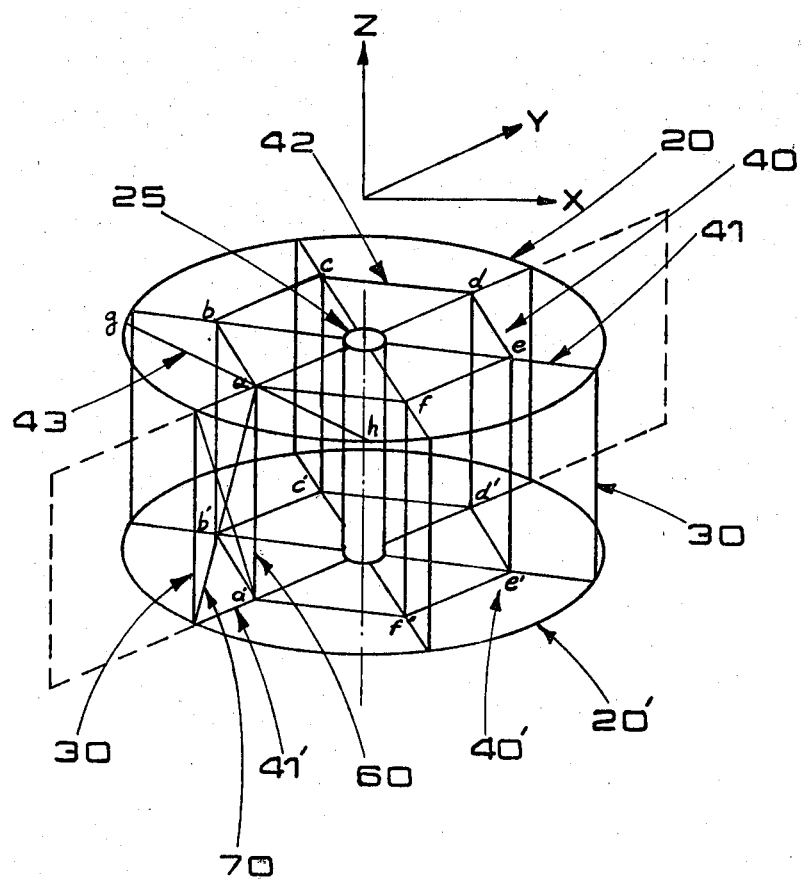
FIG. 7 is a partial view of two spaced sets of flexible cables.
Figure 8:
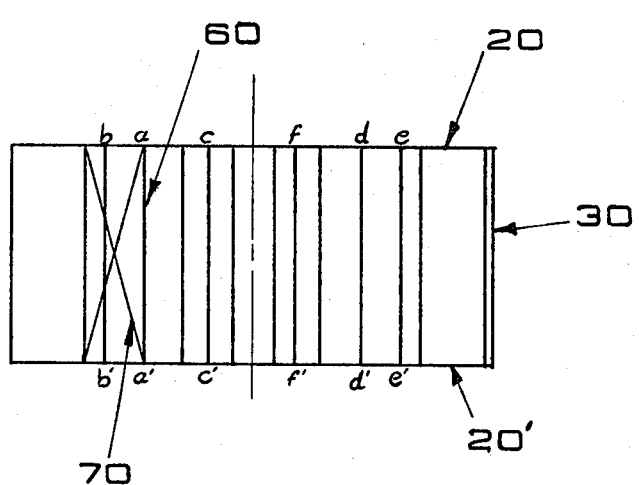
FIG. 8 is a partial side view of the apparatus of FIG. 7 showing internal columns.

FIGS. 7 and 8 show the attachment, by rigid outer columns 30, of two compression rings 20 and 20' each having flexible cables sets 40 and 40'. The cable sets are also connected to one another by a plurality of rigid internal columns 60, several of which are shown. Internal columns 60 extend parallel to one another, between the junctures of radial cables and internal cables of selected cable sets, as for example, between points "a" and "a'", "b" and "b'", etc., of sets 40 and 40' of FIGS. 7 and 8. It is to be noted that any motion of one juncture, such as "a" will result in a similar motion at a connected juncture, such as "a'". As previously explained, the points cannot move in an x-y direction. They can only move in the z direction, as shown in FIG. 7.

To prevent movement in the z direction, adjacent internal rigid columns 60 lying in the same radial plane are connected to one another by flexible cross cables 70, each cable connected to adjacent columns at their upper and lower ends, respectively, as may be seen in FIG. 2. Similarly, as shown in FIG. 7, internal columns 60 are connected to adjacent outer columns 30 or adjacent rings 20 in the same manner. Also in the same manner, the internal columns adjacent to the central hub are attached to the hub. It will now be apparent that any particular point, as, for example, point "a" will be fixed in space. The fixed junctures serve as attachment points for reflectors mounted thereon. The cable-space lattice therefore provides rigidly fixed points in space along any desired plane or curve. A selected reflector may simply rest upon the lattice with attachment by any conventional means to the compression rings or may be attached, also by conventional fasteners, to specific points on the cable lattice. A preferred embodiment of one such fastener is shown in FIGS. 9 and 10. Plates 96 are welded to and between rigid inner columns 60, shown as being right angular in cross-section. Reflector sections 7 are provided with flexible cushioning inserts 92 on juxtaposed edges and caused to rest on plates 96 and are held in position by top plates 91 and fastening screws 94 which are screwed into a threaded aperture 95 of plates 96. It is to be understood that many types of fastening means such as glue, bolt-nut assemblies, and the like may also be useable.

Referring now to FIG. 2, in particular, a cross section of a parabolic reflector mounted on the cable lattice of the present invention is shown. A pair of rigid compression rings 20 and 20' are parallel spaced from one another about a common perpendicular axis M, N and held in place by equidistantly spaced rigid outer columns 30. Five vertically spaced and parallel flexible cable sets 40 are mounted to the rigid members beginning with the lowermost compression ring 20' and continuing up the rigid outer columns 30 at preselected distances depending upon the parabolic curve of reflector 7. Each of the sets 40 are connected to cylindrical hub 25 and each of the sets include a plurality of flexible radial cables, internal cables, and at least one restraining member as previously explained. A plurality of rigid inner columns 60 are connected to and between selected flexible cable sets 40, adjacent to junctures of the radial cables and the internal cables as also previously explained. The lowermost cable set 40', supported by the lowermost compression ring 20', includes a series of polygonal figures of increased size, lying in a plane perpendicular to axis M-N, from the hub outward, formed by the internal cables, not shown, providing a series of radially spaced junctures for attachment of the internal columns. Each of the superiorly spaced sets 40 include but a single polygonal figure defined by the internal cables, with each set from bottom to top having junctures formed by the radial cables and the internal cables outwardly radially spaced relative to the junctures of the underlying set. Radially spaced internal rigid columns 60 therefore progressively increase in length as distance from the hub increases. All internal columns which are equidistant from the hub are of the same height. Diagonal flexible cables 70 are tautly connected to and between opposing ends of adjacent radially spaced internal columns thereby preventing their movement in the z or vertical direction.

Aluminum extrusions, not shown, may be fixed to the internal compression columns 60 to generate a parabolic contour forming frame for the reflectors 7.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A support structure for electromagnetic and light wave reflectors comprising:
   at least two substantially planar and rigid enclosure members, parallel spaced from one another about a common axis perpendicular to the planes of the enclosure members;
   a plurality of rigid outer columns spaced about and between the peripheral surfaces of said enclosure members and operable to immovably secure said enclosure members to one another;
   at least two spaced sets of cables; each set including a plurality of flexible radial cables connected to and between selected opposing attachment sites on said rigid members, said radial cables tautly extending between opposing sites parallel with said enclosure members and joining a hub located at the substantial axial center of said enclosure members; each set including a plurality of flexible internal cables connected to and between said radial cables at selected attachment sites on said radial cables substantially equidistant from the common central axis of said enclosure members to define one or more polygonal internal members; and each polygon attached by at least one restraining member to selected attachment sites on said rigid members, said restraining member operable to restrain tangential movement of said polygons with respect to the enclosure members;
   a plurality of rigid internal columns connected to and between said cable sets, each of said internal columns connected to a respective set at the juncture of one of said radial cables and one of said internal cables; and
   a plurality of flexible cross cables, each of said cross cables connected to and between opposing ends of adjacently spaced rigid columns in planes containing the vertical axis of said enclosure members and said rigid columns.

2. The apparatus of claim 1 wherein said rigid enclosure members are annular in configuration.

3. The apparatus of claim 1 further comprising a plurality of support members connected to and extending between opposing ends of adjacently spaced rigid outer columns for holding the common central axis of the enclosure members perpendicular to the planes of the enclosure members.

4. The apparatus of claim 3 wherein said support members are flexible cables tautly connecting said columns.

5. The apparatus of claim 1 wherein said rigid internal columns are radially spaced and of progressively greater height from said hub to said rigid enclosure members, each internal column being of equal height to other columns equidistant from said hub.

6. A support structure for dish reflectors comprising:
   at least two rigid planar annular members parallel to and spaced from one another about a common perpendicular axis;
   a plurality of equidistantly spaced rigid outer columns extending between adjacently spaced annular members substantially parallel with said common axis;
   a plurality of flexible outer diagonal cables connected to opposing ends of adjacently parallel outer columns and operable to maintain the said common axis perpendicular to the planes of said annular members;
   at least two spaced sets of flexible cables; each set parallel with an adjacent set and each set including a plurality of radial cables connected to and between selected opposing sites on said rigid members, said radial cables tautly extending between selected opposing attachment sites parallel with said annular members and joining a common hub; each set including a plurality of flexible internal cables connected to and between said radial cables substantially equidistant from the common axis of said annular members to define one or more internal polygonal members; and each polygon attached by at least one restraining member to selected attachments sites on said rigid members, said restraining members operable to restrain tangential movement of said polygons with respect to said annular members;
   a plurality of rigid internal columns connected to and between said cable sets, each of said internal columns connected to a respective set at the juncture of one of said radial cables and one of said internal cables;
   a plurality of flexible cross cables, each of said cross cables connected to and between opposing ends of adjacently spaced rigid columns in planes containing the common perpendicular axis of said annular members and longitudinal axis of said rigid columns; and
   means for connecting a reflector to the uppermost terminal ends of said internal column.

7. The apparatus of claim 6 wherein each of the internal columns located in a given vertical radial plane are of progressively greater height as the distance from said hub increases and wherein all internal rigid columns equidistant from said hub are of equal height.

* * * * *